(12) United States Patent
Kim et al.

(10) Patent No.: US 9,917,292 B2
(45) Date of Patent: Mar. 13, 2018

(54) BATTERY CELL AND BATTERY PACK USING THE SAME

(71) Applicant: SAMSUNG SDI CO., LTD., Yongin-si, Gyeonggi-do (KR)

(72) Inventors: Jin Kim, Yongin-si (KR); Jin-Man Jeoung, Yongin-si (KR); Sumihito Ishida, Yongin-si (KR)

(73) Assignee: Samsung SDI., Ltd., Yongin-si, Gyeonggi-do (KR)

( * ) Notice: Subject to any disclaimer, the term of this patent is extended or adjusted under 35 U.S.C. 154(b) by 283 days.

(21) Appl. No.: 14/734,340

(22) Filed: Jun. 9, 2015

(65) Prior Publication Data

US 2016/0036031 A1 Feb. 4, 2016

(30) Foreign Application Priority Data

Jul. 29, 2014 (KR) .................. 10-2014-0096664

(51) Int. Cl.
*H01M 2/30* (2006.01)
*H01M 2/20* (2006.01)

(52) U.S. Cl.
CPC ............ *H01M 2/30* (2013.01); *H01M 2/206* (2013.01)

(58) Field of Classification Search
CPC ...................................... H01M 2/30
USPC ......................................... 429/158
See application file for complete search history.

(56) References Cited

U.S. PATENT DOCUMENTS

| 2006/0145657 | A1* | 7/2006 | Hashida | H01M 2/1077 320/107 |
| 2012/0107675 | A1 | 5/2012 | Kim | |
| 2012/0288744 | A1 | 11/2012 | Guen | |
| 2014/0065467 | A1* | 3/2014 | Choi | H01M 2/30 429/158 |

FOREIGN PATENT DOCUMENTS

| KR | 10-2010-0005743 A | 1/2010 |
| KR | 10-2012-0047031 | 5/2012 |
| KR | 10-2012-0125874 | 11/2012 |

* cited by examiner

*Primary Examiner* — Basia A Ridley
*Assistant Examiner* — James M Erwin
(74) *Attorney, Agent, or Firm* — Lee & Morse, P.C.

(57) ABSTRACT

A battery cell includes a first electrode terminal, a second electrode terminal spaced from the first electrode terminal, and at least one sub terminal coupled to one of the first electrode terminal or the second electrode terminal. The at least one sub terminal includes at least one convex area and at least two concave areas. Each of the convex area and the at least two concave areas to establish an electrical connection with an electrode terminal of adjacent battery cells.

20 Claims, 3 Drawing Sheets

BATTERY CELL AND BATTERY PACK USING THE SAME

CROSS-REFERENCE TO RELATED APPLICATION

Korean Patent Application No. 10-2014-0096664, filed on Jul. 29, 2014, and entitled, "Battery Cell and Battery Pack Using the Same," is incorporated by reference herein in its entirety.

BACKGROUND

1. Field

One or more embodiments described herein relate to a battery cell and a battery pack using the same.

2. Description of the Related Art

Unlike a primary battery, a secondary battery may be recharged. A low-capacity secondary battery is used for small electronic devices such as phones, laptop computers, and camcorders. A large-capacity battery is used to power electric and hybrid vehicles.

Large capacity batteries may use a battery pack or battery module containing a plurality of secondary batteries, that are serially connected or connected in parallel to achieve a required capacity. In order to form the battery pack or the battery module, a plurality of battery cells may be connected using a bus bar. In addition, bolts in each battery cell terminal may be fastened by nuts.

SUMMARY

In accordance with one embodiment, a battery cell includes a first electrode terminal; a second electrode terminal spaced from the first electrode terminal; and at least one sub terminal coupled to one of the first electrode terminal or the second electrode terminal, wherein the at least one sub terminal includes at least one convex area and at least two concave areas, each of the convex area and the at least two concave areas to establish an electrical connection with an electrode terminal of adjacent battery cells.

The at least one sub terminal may be rotatably coupled to the first electrode terminal relative to a first rotational axis. The convex area of the at least one sub terminal may be spaced from the first rotational axis by a predetermined distance, and each of the at least two concave areas of the sub terminal may be separated from the first rotational axis by a distance less than the predetermined distance.

The concave area of the sub terminal may be separated from the first rotational axis by substantially a same distance. The convex area and a first one of the at least two concave areas of the sub terminal may be arranged along a first axis and are located on opposing sides of the first rotational axis, and a second one of the at least two concave areas of the sub terminal may be arranged along a second axis which crosses the first axis.

When the sub terminal may rotate to align the first axis in a first direction, the convex area of the sub terminal may extend beyond an edge of a width of the battery cell and the first one of the at least two concave areas of the sub terminal is arranged within the width of the battery cell in the first direction. When the sub terminal may rotate to align the first axis in a second direction crossing the first direction, the convex area and the first one of the at least two concave areas of the sub terminal may be arranged within the width of the battery cell in the first direction.

The at least one sub terminal may include a first sub terminal rotatably coupled to the first electrode terminal, and a second sub terminal rotatably coupled to the second electrode terminal around a second rotational axis.

In accordance with another embodiment, a battery cell may include a first electrode terminal; a second electrode terminal; and a first sub terminal to rotate relative to the first electrode terminal, wherein: the first electrode terminal is to electrically connect to a first adjacent battery cell and the second electrode terminal is to electrically connect to a second adjacent battery cell, and the first sub terminal is to rotate to a first position for a serial connection between the first and second adjacent battery cells and is to rotate to a second position for a parallel connection between the first and second adjacent battery cells.

The first sub terminal may include a first contact area; a second contact area; and a third contact area aligned along a first axis, wherein the first and second contact areas are aligned along a second axis crossing the first axis, the first axis oriented in a first direction and the second axis oriented in a second direction for the serial connection, and the first axis oriented in the second direction and the second axis oriented in the first direction for the parallel connection.

The first contact area may have a first shape, the second contact area may have a second shape, the third contact area may have the second shape, and the first shape may be different from the second shape. The first shape may be a convex shape, and the second shape may be a concave shape. The first contact area may extend beyond an edge of the battery cell and the second and third contact areas may completely overlap the battery cell for the parallel connection. The first, second, and third contact areas may completely overlap the battery cell for the serial connection.

The first sub terminal may rotate relative to the first electrode terminal about a rotational axis, the first contact area may be spaced from the rotational axis by a first distance, the second contact area may be spaced from the rotational axis by a second distance, and the third contact area may be spaced from the rotational axis by a third distance, the first distance different from the second and third distances. The second distance may be substantially equal to the third distance.

The battery cell may include a second sub terminal to rotate relative to the second electrode terminal, wherein the second sub terminal may rotate to a third position for the serial connection between the first and second adjacent battery cells, and is to rotate to the first position for the parallel connection between the first and second battery cells. The third position may be opposite to one of the first position or the second position. The first and second sub terminals may have a same structure. The first and second sub terminals may completely overlap the battery cell in the first and third positions, and the first sub terminal may extend beyond an edge of the battery cell in the second position.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
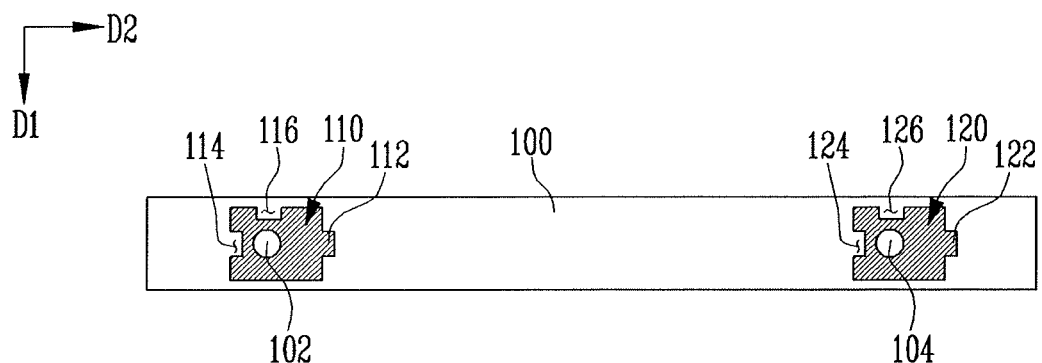
FIG. 1 illustrates an embodiment of a battery cell.

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. In the drawings, the dimensions of layers and regions may be exaggerated for clarity of illustration. Like reference numerals refer to like elements throughout.

Figure 2:
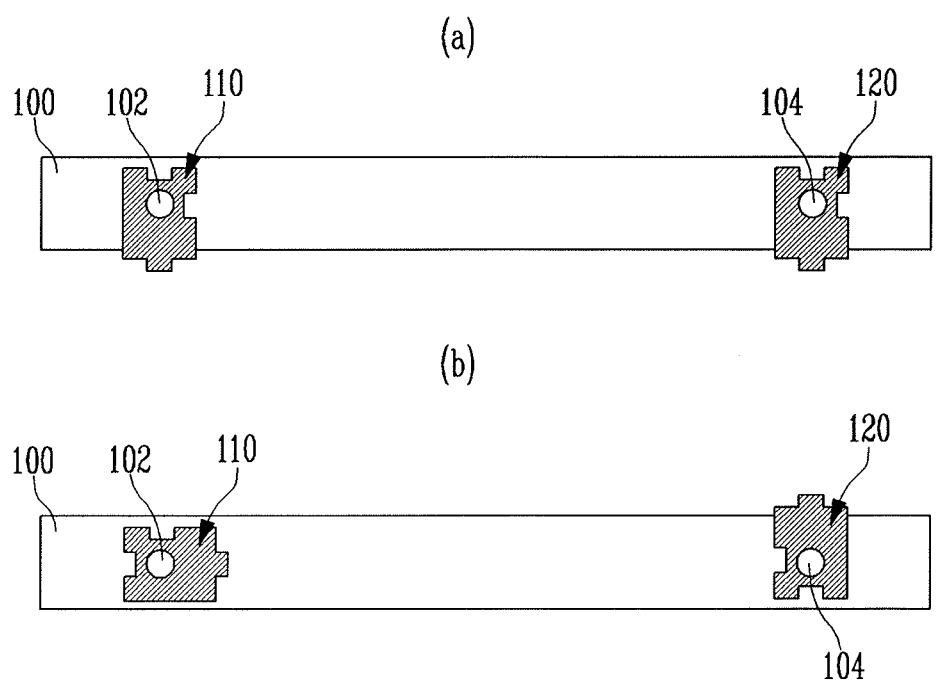
FIG. 2 illustrates an embodiment of sub terminals of a battery cell.
Figure 3:
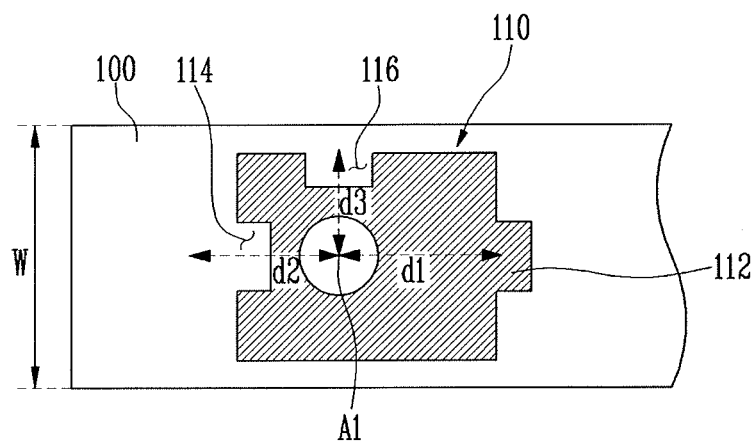
FIG. 3 illustrates one of the sub terminals.

FIG. 1 illustrates an embodiment of a top of a battery cell 100. FIG. 2 illustrating sub terminals 110 and 120 of the battery cell 100 that rotate in one or more a predetermined directions in order to form a battery pack 200. FIG. 3 illustrates an enlarged view of the sub terminal 110.

The battery cell 100 according to the embodiment of the present invention may be a square cell. According to the present invention, in order to describe a connection relationship between battery cells in priority, the plan views of the battery cells of FIGS. 1 to 3 will be described in priority. However, the present invention is not limited thereto.

As illustrated in FIGS. 1 to 3, the battery cell 100 includes first and second electrode terminals 102 and 104 arranged in a first direction D1 and separated from each other in a second direction D2, perpendicular to or crossing the first direction D1. For example, the first electrode terminal 102 may be a positive electrode terminal and the second electrode terminal 104 may be a negative electrode terminal having polarity opposite to the first electrode terminal 102.

The battery cell 100 includes at least one sub terminal coupled to one of the first and second electrode terminals 102 and 104. In this embodiment, the sub terminal includes at least one convex portion and at least two concave portions for electrical connection to adjacent battery cells.

For example, a first sub terminal 110 is rotatably coupled to the first electrode terminal 102 along a first rotational axis A1 (see FIG. 6), and includes one convex portion 112 and two concave portions 114 and 116 for electrical connection to adjacent battery cells. A second sub terminal 120 is rotatably coupled to the second electrode terminal 104 along a second rotational axis A2 (see FIG. 6), and includes one convex portion 122 and two concave portions 124 and 126 for electrical connection to adjacent battery cells.

Figure 6:
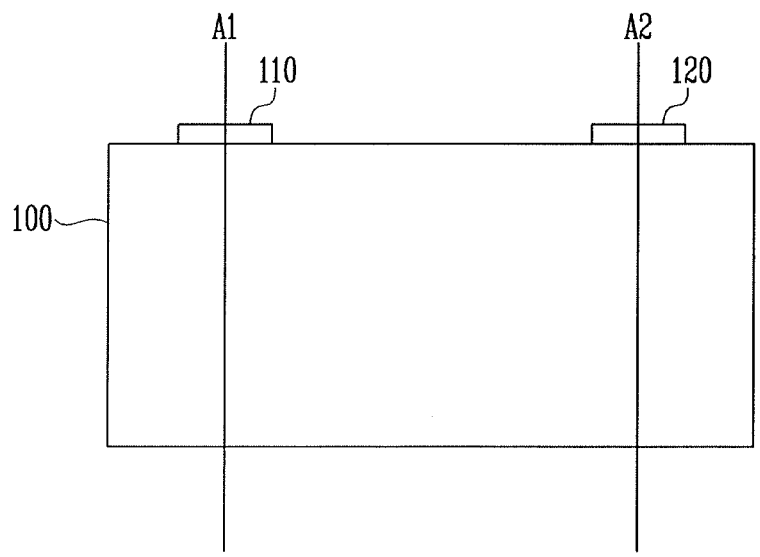
FIG. 6 illustrates an example of rotational axes of the sub terminals.

As illustrated in FIGS. 1 and 6, the rotational axes A1 and A2 may be in directions perpendicular to or which otherwise cross the first direction D1 and the second direction D2 to penetrate into or come through the plane. The battery cell 100 includes the first and second sub terminals 110 and 120 that are rotatably coupled to the first and second electrode terminals 102 and 104, to be exposed on a plane formed by the first direction D1 and the second direction D2.

The first and second sub terminals 110 and 120 serve as connectors, or connection paths, for coupling the battery cell 100 to the first and second electrode terminals 102 and 104 of other battery cells, or for supplying power from the battery cell 100 to load. The first and second sub terminals 110 and 120 may be formed of the same or different materials from the first and second electrode terminals 102 and 104. Also, the first sub terminal 110 and the second sub terminal 120 may have the same structure and configuration.

In another embodiment, the first sub terminal 110 and the second sub terminal 120 may have different structures and/or configurations.

In one embodiment, the convex portion 112 of the first sub terminal 110 is separated from the first rotational axis A1 by a predetermined distance d1. The two concave portions 114 and 116 of the first sub terminal 110 are separated from the first rotational axis A1 by distances d2 and d3, which may be less than the predetermined distance d1 taking into consideration, for example, the relationship between the battery cell 100 and one or more adjacent battery cells or a load.

Taking into consideration this relationship, the concave portions 114 and 116 may be separated from the first rotational axis A1 by the same or different distances. For example, the distances d2 and d3 by which the concave portions 114 and 116 are separated from the first rotational axis A1 may have the same or different values.

The convex portion 112 and the concave portion 114 of the first sub terminal 110 are arranged on opposite sides relative to the first rotational axis A1. The other concave portion 116 of the first sub terminal 110 is arranged to cross or be perpendicular to the concave portion 114 relative to the first rotational axis A1.

For example, the convex portion 112 and the concave portion 114 of the first sub terminal 110 may be arranged in a straight line and the other concave portion 116 of the first sub terminal 110 may be arranged to cross the straight line. The concave portions 114 and 116 may be separated from the first rotational axis A1 by the same or different distances.

In one embodiment, the first sub terminal 110 is illustrated to include the two concave portions 114 and 116. In another embodiment, the other concave portion may be formed on an opposite side of the concave portion 116. In this case, the battery cell 100 may be coupled to an adjacent battery cell or load regardless of a rotational direction of the first sub terminal 110.

The one convex portion 112 and the two concave portions 114 and 116 may be formed in the first sub terminal 110. The distances d2 and d3 by which the two concave portions 114 and 116 are separated from the first rotational axis A1 may be less than the distance d1 by which the convex portion 112 is separated from the first rotational axis A1. Therefore, the first sub terminal 110 may have an asymmetrical structure.

Due to this asymmetrical structure, when the first sub terminal 110 rotates so that the convex portion 112 and the concave portion 114 of the first sub terminal 110 are arranged in the first direction D1, the convex portion 112 of the first sub terminal 110 extends beyond an edge of a width W of (e.g., only partially overlaps) the battery cell 100 in the first direction D1. At the same time, the concave portion 114 is arranged within the width W of (e.g., completely overlaps) the battery cell 100 when the first sub terminal 110 is rotated in this manner. In the case where the two concave portions 114 and 116 are separated from the first rotational axis A1 by the same distance, the concave portion 116 may also be arranged within the width W of the battery cell 100 when the first sub terminal is rotated in the aforementioned manner.

When the first sub terminal 110 rotates so that the convex portion 112 and the concave portion 114 of the first sub terminal 110 are arranged in the second direction D2, the convex portion 112 and the concave portion 114 of the first sub terminal 110 are arranged within the width W of (e.g., completely overlaps) the battery cell 100. When the two concave portions 114 and 116 are separated from the first rotational axis A1 by the same distance, the other concave portion 116 may be arranged within the width W of (e.g., completely overlaps) the battery cell 100 when rotated in the aforementioned manner.

Therefore, in accordance with one embodiment, the battery cells may be serially coupled or coupled in parallel to another battery cell or load with equal ease, to accommodate differing and varying designs.

Figure 4:
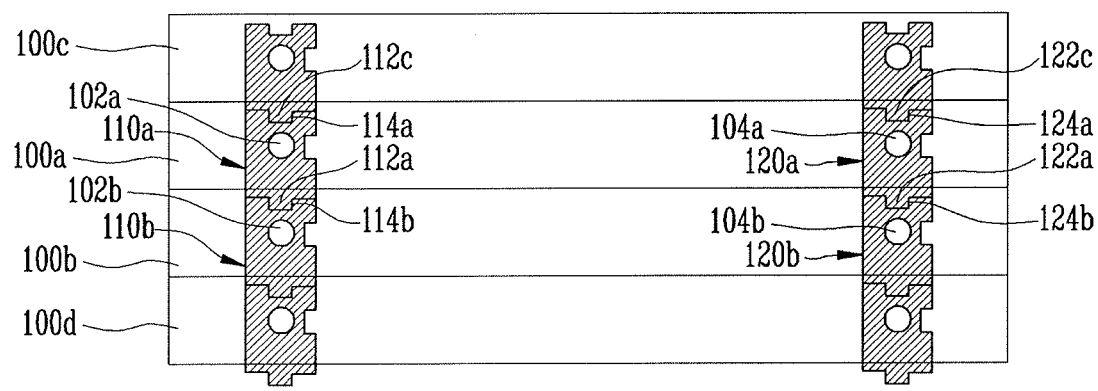
FIG. 4 illustrates a battery pack with battery cells connected in parallel.
Figure 5:
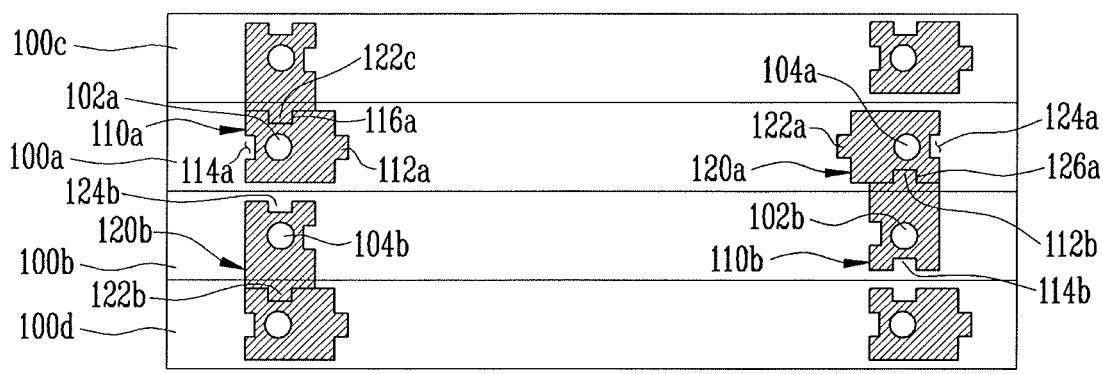
FIG. 5 illustrates a battery pack with battery cells connected in series.

FIGS. 4 and 5 illustrate examples of connecting battery cells 100 in different ways to form a battery pack 200 according to one embodiment. FIG. 4 illustrates the battery pack 200 where battery cells 100a to 100d are arranged side-by-side in a first direction D1 and connected in parallel. FIG. 5 illustrates the battery pack 200 where battery cells 100a to 100d are arranged side-by-side in a first direction D1 and are connected in series.

In one embodiment, it is assumed that four battery cells 100a to 100d are included in the battery pack 200. The battery cell 100a is arranged in a second position in the first direction D1 and may be referred to as a first battery cell. The battery cell 100b is arranged in a third position in the first direction D1 adjacent to the first battery cell 100, and may be referred to as a second battery cell. The battery cell 100c is arranged in a first position in the first direction D1 adjacent to the first battery cell 100a, and may be referred to as a third battery cell. The battery cell 100d is arranged in a fourth position in the first direction D1 and may be referred to as a fourth battery cell.

The first battery cell 100a includes first and second sub terminals 110a and 120a rotatably and respectively coupled to first and second electrode terminals 102a and 104a of the first battery cell 100a and exposed on a plane formed by the first direction D1 and the second direction D2.

The second battery cell 100b is adjacent to one side of the first battery cell 100a and includes first and second electrode terminals 102b and 104b. First and second sub terminals 110b and 120b are rotatably and respectively coupled to the first and second electrode terminals 102b and 104b on a plane formed by the first direction D1 and the second direction D2. The third battery cell 100c and the fourth battery cell 100d may be described a similar manner.

A connection relationship between the battery cells in FIG. 4 will now be described. First, in order to connect the battery cells in parallel, the first battery cell 100a is arranged side-by-side with the second battery cell 100b adjacent to the first battery cell 100a in the first direction D1. The first and second sub terminals 110a and 120a of the first battery cell 100a are rotated so that convex portions 112a and 122a and concave portions 114a and 124a are arranged in the first direction D1.

The convex portion 112a of the first sub terminal 110a of the first battery cell 100a is coupled (e.g., fastened) to one concave portion 114b of the first sub terminal 110b of the second battery cell 100b. The convex portion 122a of the second sub terminal 120a of the first battery cell 100a is coupled (e.g., fastened) to one concave portion 124b of the second sub terminal 120b of the second battery cell 100b.

A convex portion 112c of a first sub terminal 110c of the third battery cell 100c and a convex portion 122c of a second sub terminal 120c of the third battery cell 100c are coupled (e.g., fastened) to the concave portion 114a of the first sub terminal 110a of the first battery cell 100a and the concave portion 124a of the second sub terminal 120a of the first battery cell 100a. The same fastening method may be applied to the fourth battery cell 100d.

As described above, in accordance with at least one embodiment, each of the first and second sub terminals of the battery cell has an asymmetrical structure in which the distance by which the convex portion is separated from the rotational axis is less than the distance by which the concave portions are separated from the rotational axis. Therefore, the convex portions of the sub terminals of the battery cell may be coupled (e.g., fastened) to the concave portions of the sub terminals of the adjacent battery cell in a state in which the convex portions rotate in the first direction.

Because of this asymmetrical and rotational structure, when the battery cells are arranged side-by-side in the first direction, the convex portions of the sub terminals of the battery cell may be fastened to the concave portions of the sub terminals of the adjacent battery cell to allow the battery cells may be connected in parallel. This connection structure may exist without interfering with or otherwise extending the thickness W of the battery cells in the first direction.

Referring to FIG. 5, in order to serially connect the battery cells, the first battery cell 100a has a first side arranged adjacent to the second battery cell 100b and a second side arranged adjacent to the third battery cell 100c in the first direction D1. The first and second sub terminals 110a and 120a of the first battery cell 100a are rotated to arrange the convex portions 112a and 122a and the concave portions 114a and 124a in the second direction D2.

The first and second sub terminals 110b and 120b of the second battery cell 100b are rotated to arrange convex portions 112b and 122b and the concave portions 114b and 124b are arranged in the first direction D1.

The other concave portion 116a of the first sub terminal 110a of the first battery cell 100a is coupled (e.g., fastened) to the convex portion 122c of the second sub terminal 120c of the third battery cell 100c. The other concave portion 126a of the second sub terminal 120a of the first battery cell 100a is coupled (e.g., fastened) to the convex portion 112b of the first sub terminal 110b of the second battery cell 100b. The convex portion 122b of the second sub terminal 120b of the second battery cell 100b may be coupled (e.g., fastened) to the other concave portion 116d of a first sub terminal 110d of the fourth battery cell 100d in a similar manner.

Because each of the first and second sub terminals of the battery cell has an asymmetrical structure, when the convex portion of one sub terminal of one battery cell rotates in the second direction, the other concave portion may be fastened to the convex portion of the adjacent battery cell.

Also, because of this asymmetrical and rotational structure, when the battery cells are arranged side-by-side in the first direction, the other concave portions of the sub terminals of the battery cell may be fastened to the convex portions of the sub terminals of the adjacent battery cell to allow for a serial connection of the battery cells. This connection structure may exist without interfering with or otherwise extending the thickness W of the battery cells in the first direction.

Also, in at least one embodiment, the convex portion and one concave portion of each sub terminal may be used to establish a parallel connection between battery cells. The convex portion and the other concave portion of each sub terminal may be used to establish a serial connection between battery cells.

Also, when the battery module 200 is formed of the battery cells 100, the adjacent battery cells may be connected serially or in parallel with equal ease. Thus, it is possible to reduce the number of parts, working processes, and manufacturing costs for providing a battery pack.

In another embodiment, a battery cell may have one rotatable sub terminal coupled to an electrode terminal as described above. In this embodiment, a second sub terminal or electrode terminal may be included which is fixed, e.g.

not rotatable. A battery pack may be formed to include a plurality of such battery cells. In one embodiment, one or more of the sub terminals may be integrally formed with one or more corresponding electrode terminals. In this latter case, the one or more electrode terminals may also rotate.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the present invention as set forth in the following claims.

What is claimed is:

1. A battery cell, comprising:
   a first electrode terminal;
   a second electrode terminal spaced from the first electrode terminal; and
   at least one sub terminal rotatably coupled to one of the first electrode terminal or the second electrode terminal, wherein the at least one sub terminal includes at least one convex area and at least two concave areas, each of the convex area and the at least two concave areas to establish an electrical connection with an electrode terminal of adjacent battery cells, the at least one convex area having a size corresponding to a size of a concave area of a sub terminal of another battery cell, the at least one convex area rotated to receive the concave area of the sub terminal of the another battery cell.

2. The battery cell as claimed in claim 1, wherein the at least one sub terminal is rotatably coupled to the first electrode terminal relative to a first rotational axis.

3. The battery cell as claimed in claim 2, wherein:
   the convex area of the at least one sub terminal is spaced from the first rotational axis by a predetermined distance, and
   each of the at least two concave areas of the sub terminal is separated from the first rotational axis by a distance less than the predetermined distance.

4. The battery cell as claimed in claim 3, wherein the concave area of the sub terminal is separated from the first rotational axis by substantially a same distance.

5. The battery cell as claimed in claim 4, wherein:
   the convex area and a first one of the at least two concave areas of the sub terminal are arranged along a first axis and are located on opposing sides of the first rotational axis, and
   a second one of the at least two concave areas of the sub terminal is arranged along a second axis which crosses the first axis.

6. The battery cell as claimed in claim 5, wherein:
   when the sub terminal is rotated to align the first axis in a first direction, the convex area of the sub terminal extends beyond an edge of a width of the battery cell and the first one of the at least two concave areas of the sub terminal is arranged within the width of the battery cell in the first direction.

7. The battery cell as claimed in claim 6, wherein:
   when the sub terminal is rotated to align the first axis in a second direction crossing the first direction, the convex area and the first one of the at least two concave areas of the sub terminal are arranged within the width of the battery cell in the first direction.

8. The battery cell as claimed in claim 1, wherein the at least one sub terminal includes:
   a first sub terminal rotatably coupled to the first electrode terminal, and
   a second sub terminal rotatably coupled to the second electrode terminal around a second rotational axis.

9. A battery cell, comprising:
   a first electrode terminal;
   a second electrode terminal; and
   a first sub terminal rotatably coupled to the first electrode terminal, wherein:
   the first electrode terminal is to electrically connect to a first adjacent battery cell and the second electrode terminal is to electrically connect to a second adjacent battery cell, and
   the first sub terminal establishes a serial connection between the first and second adjacent battery cells in a first rotated position and establishes a parallel connection between the first and second adjacent battery cells in a second rotated position.

10. The battery cell as claimed in claim 9, the first sub terminal includes:
    a first contact area;
    a second contact area; and
    a third contact area aligned along a first axis,
    wherein the first and second contact areas are aligned along a second axis crossing the first axis, the first axis oriented in a first direction and the second axis oriented in a second direction for the serial connection, and the first axis oriented in the second direction and the second axis oriented in the first direction for the parallel connection.

11. The battery cell as claimed in claim 10, wherein:
    the first contact area has a first shape,
    the second contact area has a second shape,
    the third contact area has the second shape, and
    the first shape is different from the second shape.

12. The battery cell as claimed in claim 11, wherein:
    the first shape is a convex shape, and
    the second shape is a concave shape.

13. The battery cell as claimed in claim 11, wherein the first contact area extends beyond an edge of the battery cell and the second and third contact areas completely overlap the battery cell for the parallel connection.

14. The battery cell as claimed in claim 13, wherein the first, second, and third contact areas completely overlap the battery cell for the serial connection.

15. The battery cell as claimed in claim 11, wherein:
    the first sub terminal rotates relative to the first electrode terminal about a rotational axis,
    the first contact area is spaced from the rotational axis by a first distance,
    the second contact area is spaced from the rotational axis by a second distance, and
    the third contact area is spaced from the rotational axis by a third distance, the first distance different from the second and third distances.

16. The battery cell as claimed in claim 15, wherein the second distance is substantially equal to the third distance.

17. The battery cell as claimed in claim 9, further comprising:
    a second sub terminal to rotate relative to the second electrode terminal, wherein the second sub terminal establishes the serial connection between the first and second adjacent battery cells in a third rotated position, and establishes the parallel connection between the first and second battery cells in the first rotated position.

18. The battery cell as claimed in claim 17, wherein the third rotated position is opposite to one of the first rotated position or the second rotated position.

19. The battery cell as claimed in claim 17, wherein the first and second sub terminals have a same structure.

20. The battery cell as claimed in claim 17, wherein:
the first and second sub terminals completely overlap the battery cell in the first and third rotated positions, and
the first sub terminal extends beyond an edge of the battery cell in the second rotated position.

* * * * *